(12) United States Patent
Elazar (10) Patent No.: US 6,959,079 B2
(45) Date of Patent: Oct. 25, 2005

(54) TELEPHONE CALL MONITORING SYSTEM

(75) Inventor: Avishai Elazar, Sunnyvale, CA (US)

(73) Assignee: Nice Systems Ltd., Ra'anana (IL)

( * ) Notice: Subject to any disclaimer, the term of this patent is extended or adjusted under 35 U.S.C. 154(b) by 14 days.

(21) Appl. No.: 10/367,749

(22) Filed: Feb. 19, 2003

(65) Prior Publication Data

US 2003/0147522 A1 Aug. 7, 2003

Related U.S. Application Data

(63) Continuation of application No. 09/503,479, filed on Feb. 14, 2000, now Pat. No. 6,542,602.

(51) Int. Cl.⁷ ............................. H04M 3/00; H04M 5/00
(52) U.S. Cl. ................................................ 379/265.06
(58) Field of Search ....................... 379/265.06, 265.07, 379/265.02, 266.01–266.03, 88.01–88.04, 142.01, 112.01

(56) References Cited

U.S. PATENT DOCUMENTS

| | | | |
|---|---|---|---|
| 5,946,375 A | | 8/1999 | Pattison et al. |
| 6,230,197 B1 | * | 5/2001 | Beck et al. ................. 709/223 |
| 6,263,049 B1 | * | 7/2001 | Kuhn ....................... 379/32.01 |

* cited by examiner

*Primary Examiner*—Benny Tieu
(74) *Attorney, Agent, or Firm*—Pearl Cohen Zedek Latzer, LLP (57) ABSTRACT

A monitoring system for monitoring agent telephonic interactions with customers and a method thereof is provided. The system may comprise a voice logger to receive and record audio of a telephone call received by the agent, a screen logger to receive and record video screen data associated with interactions of the agent with a computer during the telephone call and an event manager to determine whether the interactions meet at least one predefined monitoring condition.

6 Claims, 13 Drawing Sheets

TELEPHONE CALL MONITORING SYSTEM

CROSS REFERENCE TO RELATED APPLICATIONS

This application is a continuation application of patent application Ser. No. 09/503,479 filed on Feb. 14, 2000 now U.S. Pat. No. 6,542,602.

FIELD OF THE INVENTION

The present invention is related to telephone call monitoring systems in general, and in particular to apparatus and methods for logging telephone calls according to non-time-based scheduling criteria.

BACKGROUND OF THE INVENTION

Telephone call monitoring systems are increasingly being used by businesses to monitor the effectiveness of agents who receive telephone calls. In prior art telephone call monitoring systems data are typically collected on each incoming call to the system. This data consists of a log of events occurring in the system over time for an incoming call. Typical logged data elements are receipt of call, call offered to an application, call presented to an agent or an agent group, call handled or abandoned and length of call. The data representing these data elements are then processed to generate reports for use by management or supervisory personnel. The data may be organized in any number of ways, such as by agent, telephone trunk, agent groups and the like. Based on this information, management and supervisory personnel are able to evaluate an agent's telephone call activity and take corrective action where an agent's performance falls below acceptable norms.

Unfortunately, prior art telephone call monitoring systems are limited in their ability to discriminate between different telephone calls and agents based on criteria other than simple scheduling imperatives and rely almost entirely on human intervention to evaluate the quality of service provided by an agent. Prior art telephone call monitoring systems that provide for telephone call recording typically record either all telephone calls received by an agent or record telephone calls according to a schedule.

BRIEF DESCRIPTION OF THE DRAWINGS

The present invention will be understood and appreciated more fully from the following detailed description taken in conjunction with the appended drawings in which.

DETAILED DESCRIPTION OF THE INVENTION

Notation Used Throughout

The following notation is used throughout this document.

| Term | Definition |
| --- | --- |
| ACD | Automatic Call Distributor. A telephony switch capable of managing the automatic distribution of incoming calls to agents or sales representatives based on predefined call allocation algorithms. ACDs are usually found in call centers. |
| ANI | Automatic Number Identification. The telephone number of the calling party. This data is provided to the called party by the PSTN. |
| CTI | Computer Telephony Integration. A set of applications that integrates the telephony resources and computerized resources of an organization in order to provide added value services. |
| CTI link | An external port of a telephony switch via which an external computer can get Information regarding calls managed by the switch and can control the operation of the switch as well. |
| DNIS | Dialed Number Identification Service. A service that identifies the called telephone number. |
| DTMF | Dual Tone Multiple Frequency. A set of predefined combinations of tones generated by pressing the keys of a telephone set. |
| IVR | Interactive Voice Response. A computer-based product connected to a switch. IVR product enables a remote caller to pass or to retrieve information to or from a database or other computerized platform connected to the switch. The remote caller controls the IVR using DTMF. |
| PSTN | Public Switched Telephone Network. |
| QA | Quality Assurance. |

Figure 1:
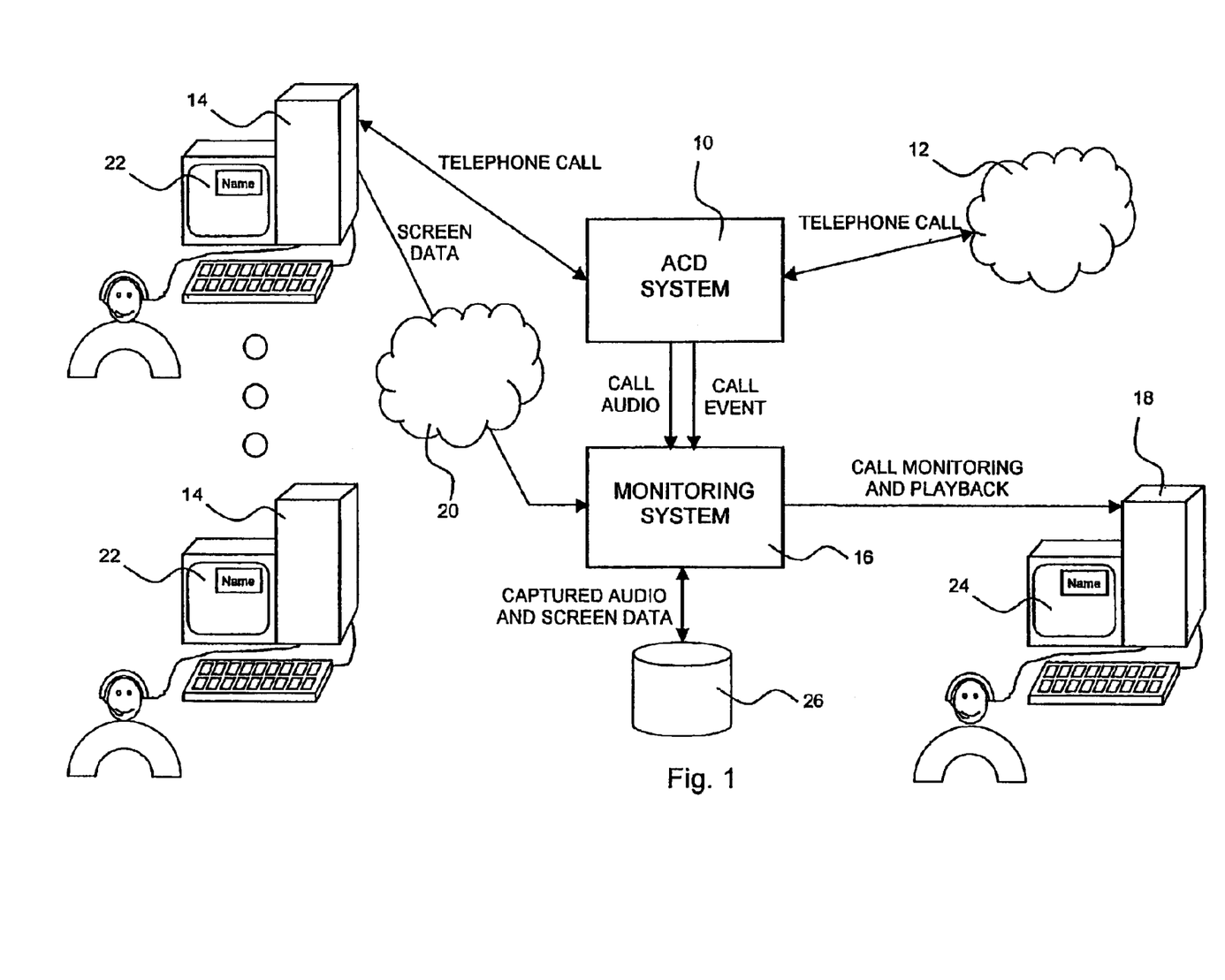
FIG. 1 is a simplified block diagram of an exemplary Automatic Call Distribution (ACD) system connected to an external telephonic network and agent telephonic workstations in which a telephone call monitoring system, constructed and operative in accordance with a preferred embodiment of the present invention, may be advantageously implemented.

Reference is now made to FIG. 1 which is a simplified block diagram of an exemplary prior art Automatic Call Distribution system, herein referred to as ACD 10, connected to an external telephonic network 12 and a plurality of agent telephonic workstations 14 in which a monitoring system 16, constructed and operative in accordance with a preferred embodiment of the present invention, may be advantageously implemented. ACD 10 routes incoming telephone calls received via network 12 to a plurality of agent telephonic workstations 14. As will be readily apparent to those skilled in the art, ACD 10 and telephonic workstations 14 may be any of a number of different, commercially-available systems or devices used in ACD systems.

Monitoring system 16 is preferably in communication with ACD 10 for receiving notifications of telephone calls that have been routed by ACD 10 to agent telephonic workstations 14 and for receiving therefrom any audio portion of the telephone calls. Monitoring system 16 is also preferably in communication with agent telephonic workstations 14, either directly or via a computer network 20, such as a local area network (LAN), for receiving screen data captured from a display 22 of workstation 14 before, during, or after a telephone call is received at workstation 14, typically using any conventional screen data capture means assembled with workstation 14.

Monitoring system 16 preferably stores captured audio and screen data to one or more storage media 26 and provides captured audio and screen data to one or more supervisor workstations 18 either in real-time or later in a playback mode where audio, screen data, and other data may be monitored separately or simultaneously. Supervisor workstation 18 preferably includes a display 24 for displaying information relating to the operation of ACD 10 and to the performance of an agent as is described in greater detail hereinbelow.

Figure 2:
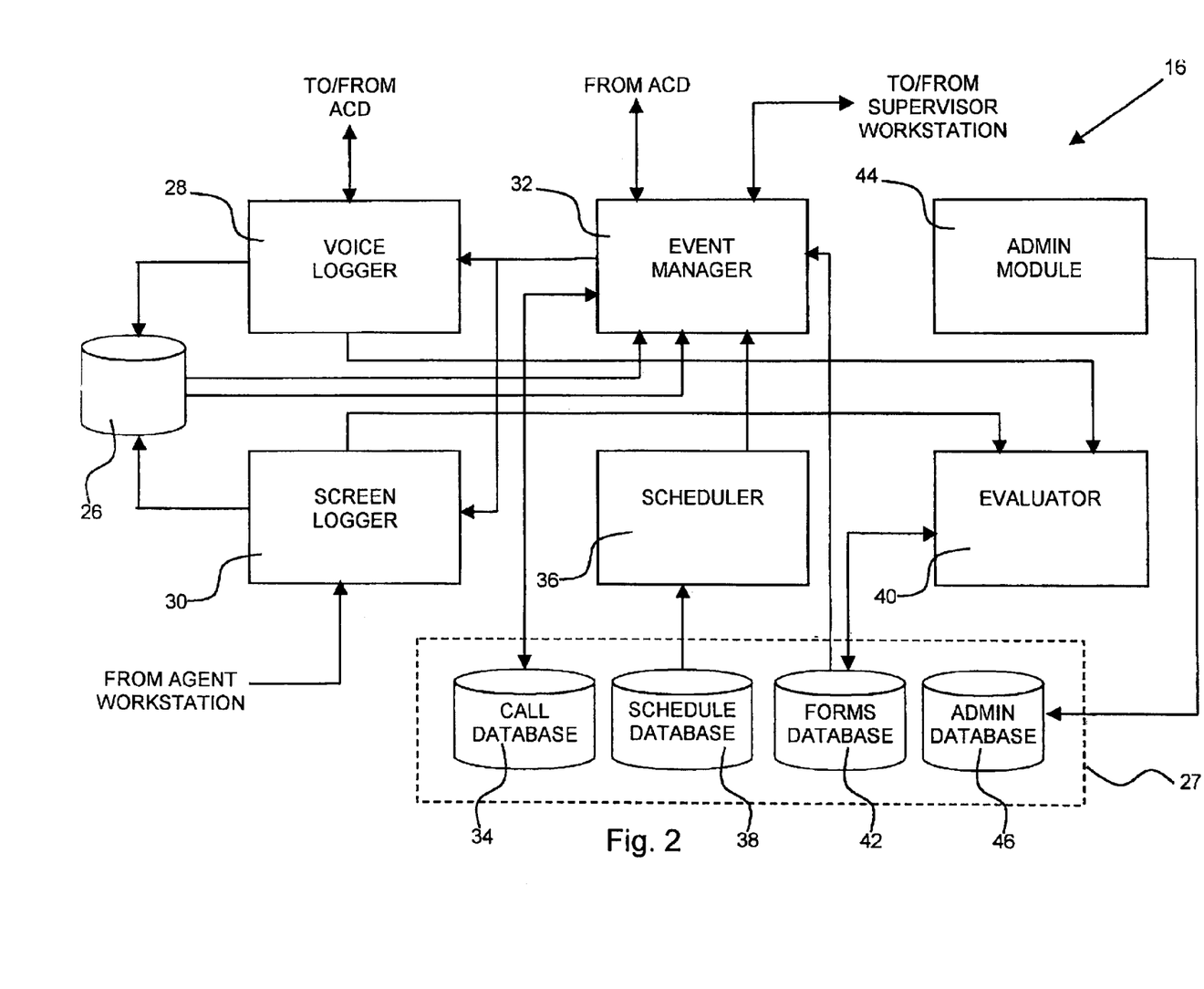
FIG. 2 is a simplified block diagram of a telephone call monitoring system, constructed and operative in accordance with a preferred embodiment of the present invention.

Additional reference is now made to FIG. 2, which is a simplified block diagram of monitoring system 16 of FIG. 1, constructed and operative in accordance with a preferred embodiment of the present invention. Monitoring system 16 preferably comprises a voice logger 28 which receives telephone call audio from ACD 10 and records the audio. Voice logger 28 is typically connected to ACD 10 via an ACD input or output channel or via a LAN audio channel. Voice logger 28 may also provide audio playback to ACD 10. A screen logger 30 is also provided which receives video screen data from workstations 14 and records the captured screen data. Monitoring system storage 27 is also provided, comprising a call database 34, a schedule database 38, a forms database 42, and an admin database 46.

An event manager 32 receives notifications from ACD 10 of telephone calls that have been routed to workstations 14 and preferably logs information regarding the calls received from ACD 10 in call database 34. Such information typically includes the outside party's telephone number, the locations of the telephone call recordings in storage 26, the time the call was made or received, and the duration of the call. Event manager 32 may then control voice logger 28 and screen logger 30 to begin recording audio and screen data of a telephone call for which an event notification has been received. Event manager 32 is typically connected to ACD 10 via a Computer Telephony Integration (CTI) port or via an ACD management port. Event manager 32 may provide audio and screen data associated with a particular telephone call as soon as it is switched to supervisor workstation 18 for real-time monitoring, or may receive playback requests from supervisor workstation 18, in response to which event manager 32 retrieves the requested audio and/or screen data from storage media 26 and provides the audio and/or screen data to workstation 18 for output.

A scheduler 36 provides event manager 32 with scheduling information stored in schedule database 38. The scheduling information may include:

1. how often to monitor a particular agent or all agents;
2. how often to monitor a particular agent group (where an agent in the group might then be selected at random for monitoring);
3. a percentage of calls to be monitored for a particular agent, all agents, an agent group, or department;
4. how many calls a particular supervisor or all supervisors are to monitor in a given period.

The scheduling information may also include non-temporal "scheduling" criteria such as 1. telephone numbers of customers who should or should not be monitored;
2. specific data fields on display 22 (FIG. 1) that, when data are entered into the fields, signal that the call is to be monitored;
3. a table of agent scores and the monitoring frequency for each score level;
4. a table of agent skills and the monitoring frequency for each skill;
5. words that, when spoken during a telephone call, signal that the call is to be monitored (e.g., obscenities);
6. words that, when not spoken during a telephone call, signal that the call is to be monitored (e.g., "please" and "thank you");
7. a table of speech rates and the monitoring frequency for each speech rate;
8. a table of word counts and the monitoring frequency for different word counts; and
9. CTI data, including business information gathered regarding the calling or called party.

Event manager 32 may use the information in database 38 to make scheduling determinations such as whether a telephone call received from or made to a particular telephone number, such as may be determined through Automatic Number Identification (ANI) or Dialed Number Identification Service (DNIS), is due to be recorded, whether a particular agent is due for monitoring, whether the supervisor is due to monitor any or a particular call or agent, or whether other calling functions, such as "call transfer" or "hold" as may be determined through DTMF activation signals, require monitoring.

An evaluator 40 preferably provides a means for designing evaluation forms and for storing forms and evaluation data in forms database 42. Evaluation forms may be completed on-screen by a supervisor via workstation 18 or by an agent via workstation 14 for such purposes as evaluating agent performance or providing a customer interaction debriefing. Evaluator 40 may also receive audio and/or screen data from voice logger 28 and screen logger 30 and perform automated evaluations in accordance with preprogrammed algorithms. Such evaluations may include determining what words are spoken during a telephone call and speech rates using Digital Signal Processing (DSP) and speech recognition technologies well known in the art. Event manager 32 preferably accesses evaluation data stored in database 42 to support monitoring decisions as described hereinabove.

An administration module 44 provides for the definition of agents, supervisors, and other users and groups who may access various aspects of monitoring system 16 as well as security rules for such access. These definitions are stored in administration database 46.

Although not particularly shown in FIG. 2, any of voice logger 28, screen logger 30, event manager 32, scheduler 36, evaluator 40, and admin module 42 may access any of the information in databases 34, 38, 42, and 46. For example, scheduler 36 may access admin database 46 to detect changes in agent detail and modify scheduling information accordingly.

Figure 3:
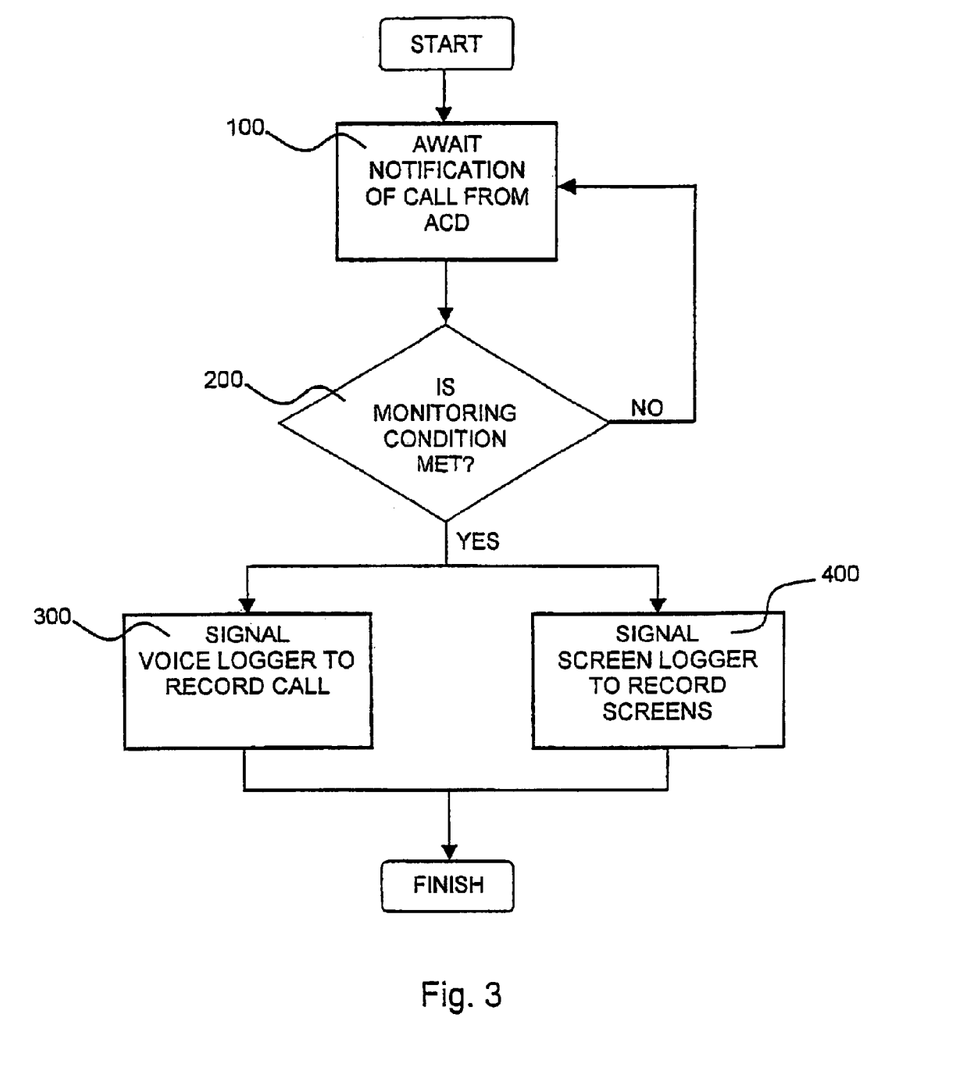
FIG. 3 is a simplified flowchart illustration of a method of operation of the telephone call monitoring system of FIG. 2, the method being operative in accordance with a preferred embodiment of the present invention.

Reference is now made to FIG. 3, which is a simplified flowchart illustration of a method of operation of monitoring system 16 of FIG. 1, the method being operative in accordance with a preferred embodiment of the present invention. In the method of FIG. 3 a notification of a customer telephone call is received from ACD 10 indicating that a call is currently in progress with a particular agent (step 100). Event manager 32 (FIG. 2) then determines whether the telephone call is to be monitored by determining whether at least one predefined monitoring condition is true (step 200). If the condition is true, event manager 32 signals voice logger 28 to record some or all of the audio of the telephone call (step 300) and screen logger 30 to record in synchronicity with the audio recording of voice logger 28 some or all of the agent's interactions with the agent's workstation during the telephone call, preferably in the form of screen data captures (step 400).

A portion of the audio and/or screen data may be pre-recorded prior to and in support of performing step 200, in which the monitoring condition is tested. Under such circumstances, the signals to record referred to in steps 300 and 400 may be understood as directives to continue to record once the satisfaction of the monitoring condition has been established, or, if step 200 is carried out after the entire call has been recorded, as directives to retain the recording already made. Where a first portion of the telephone call was pre-recorded prior to performing step 200, it may be combined with any portions of the telephone call recorded after satisfaction of the monitoring condition has been established.

Figure 4:
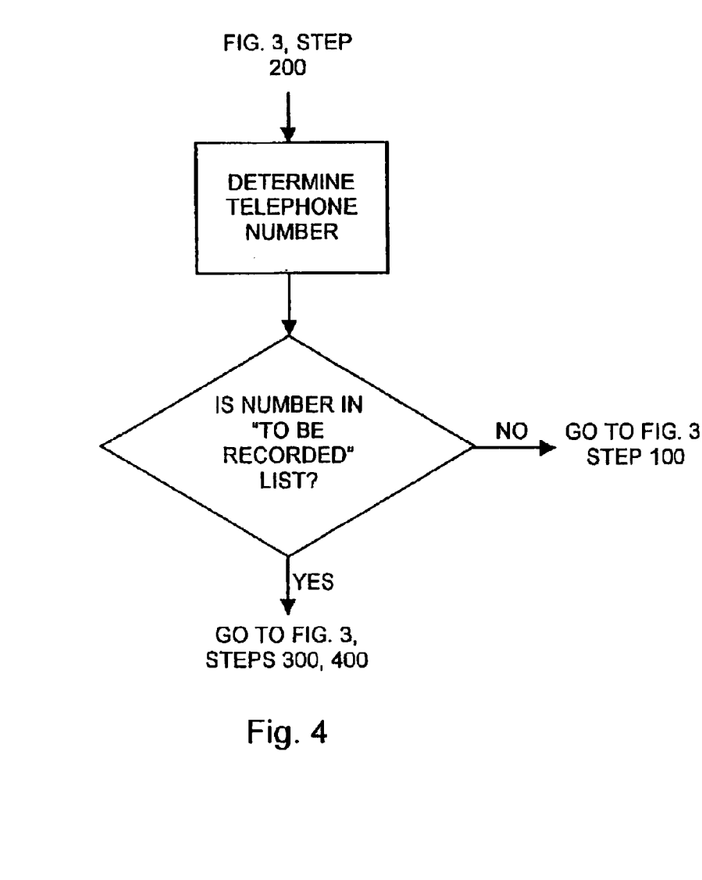
FIGS. 4–20 are simplified flowchart illustrations of implementations of the monitoring condition step 200 of FIG. 3, operative in accordance with multiple preferred embodiments of the present invention.

Reference is now made to FIG. 4 which is a simplified flowchart illustration of an implementation of determining step 200 of FIG. 3, operative in accordance with a preferred embodiment, of the present invention. In the method shown the determining step comprises determining the telephone number from which the call has been made. The monitoring condition is satisfied if the telephone number or a portion thereof is in a database of telephone numbers whose calls are to be recorded, the information typically maintained in schedule database 38 (FIG. 2). An example of a telephone number portion may be 212-xxx-xxxx, indicating that all calls from the 212 area code are to be recorded, or 212-605-xxxx, indicating that only area code 212 calls from exchange 605 are to be recorded.

Figure 5:
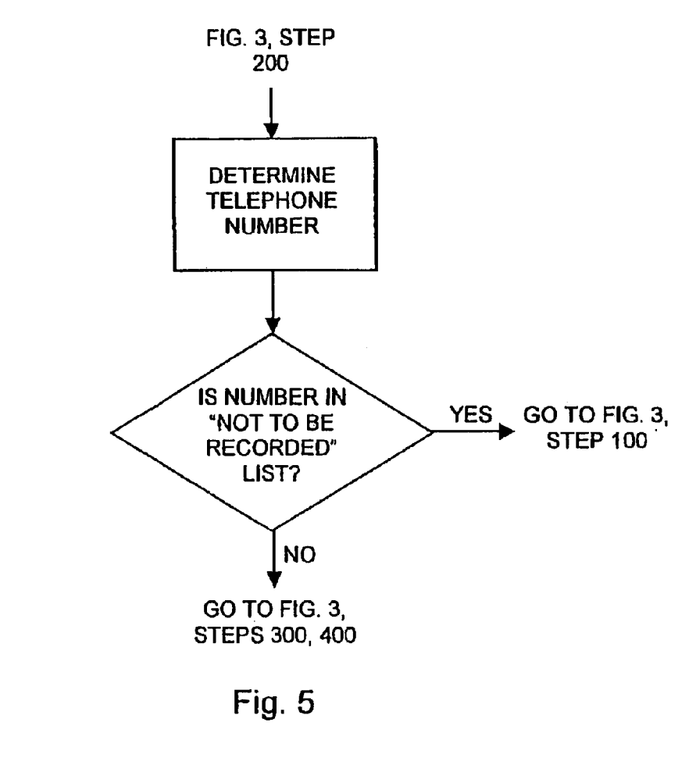

Reference is now made to FIG. 5, which is a simplified flowchart illustration of an implementation of determining step 200 of FIG. 3, operative in accordance with a preferred embodiment of the present invention. In the method shown the determining step comprises determining the telephone number from which the call has been made. The monitoring condition is satisfied if the telephone number is not in a database of telephone numbers whose calls are not to be recorded, the information typically maintained in schedule database 38 (FIG. 2). An example of a telephone number portion may be 212-xxx-xxxx, indicating that all calls outside the 212 area code are to be recorded, or 212-605-xxxx, indicating that calls outside area code 212 and exchange 605 are to be recorded.

Figure 6:
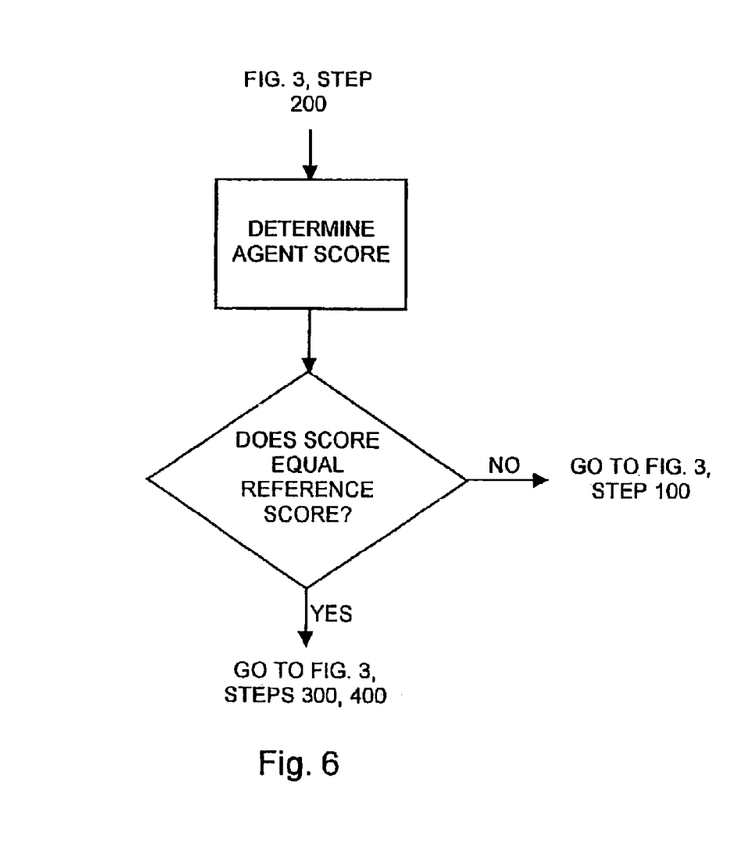

Reference is now made to FIG. 6 which is a simplified flowchart illustration of an implementation of determining step 200 of FIG. 3, operative in accordance with a preferred embodiment of the present invention. In the method shown the determining step comprises retrieving a score for the agent, the information typically maintained in forms database 42. The monitoring condition is satisfied if the score is equal to a predetermined reference score that warrants monitoring of the call.

Figure 7:
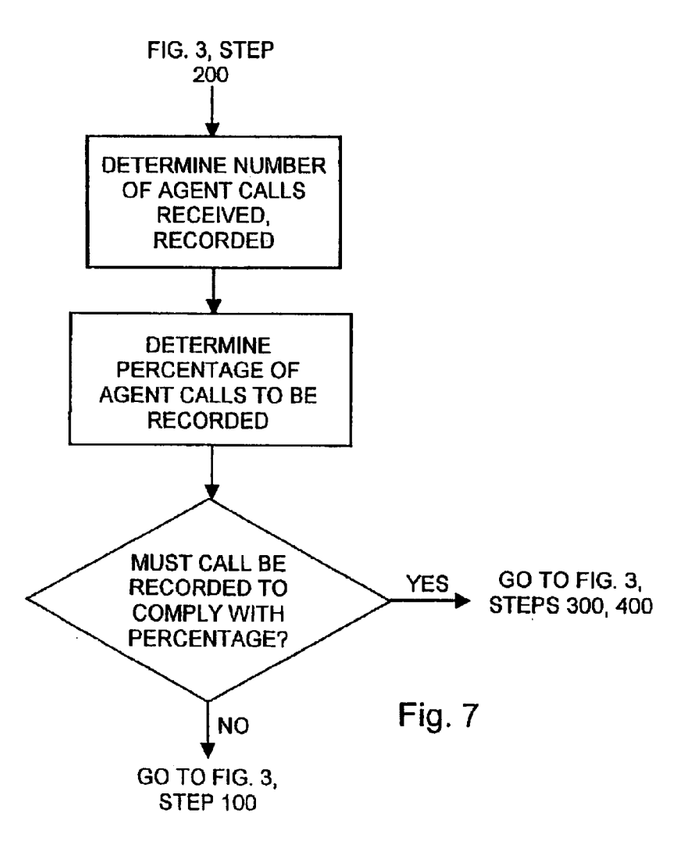

Reference is now made to FIG. 7, which is a simplified flowchart illustration of an implementation of determining step 200 of FIG. 3, operative in accordance with a preferred embodiment of the present invention. In the method shown the determining step comprises retrieving the number of calls which the agent has received and the number of the calls which have been recorded, both of which are typically maintained in calls database 34, and a percentage of the agent's calls which are to be recorded, the information typically maintained in schedule database 38. The monitoring condition is satisfied if the call currently in progress must be recorded in order to comply with the percentage of the agent's calls which are to be recorded.

Figure 8:
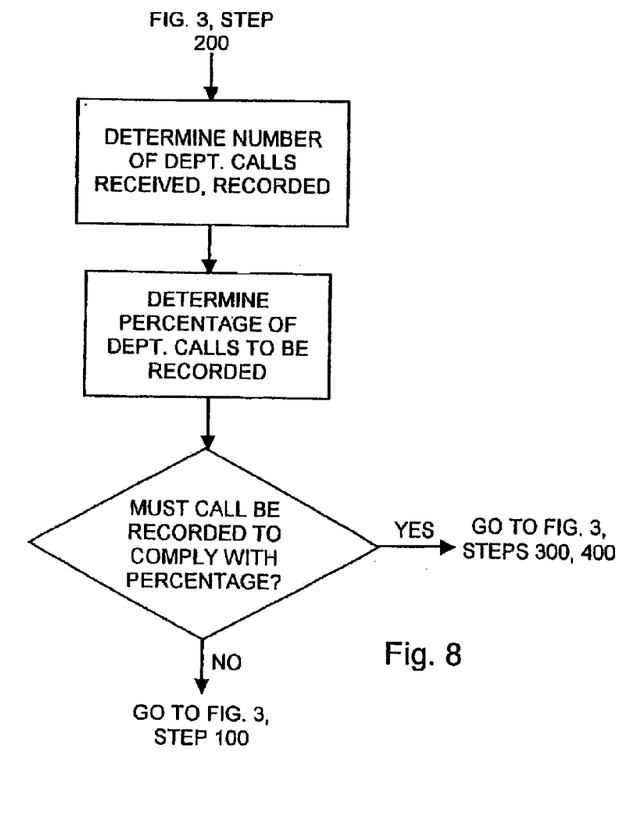

Reference is now made to FIG. 8 which is a simplified flowchart illustration of an implementation of determining step 200 of FIG. 3, operative in accordance with a preferred embodiment of the present invention. In the method shown the determining step comprises determining the department to which the agent belongs, the information typically maintained in admin database 46, retrieving the number of calls which the department has received and the number of the calls which have been recorded, both of which are typically maintained in calls database 34 or may be calculated therefrom, and determining the percentage of the department's calls which are to be recorded, the information typically maintained in schedule database 38. The monitoring condition is satisfied if the call currently in progress must be recorded in order to comply with the percentage of the department's calls, which are to be recorded.

Figure 9:
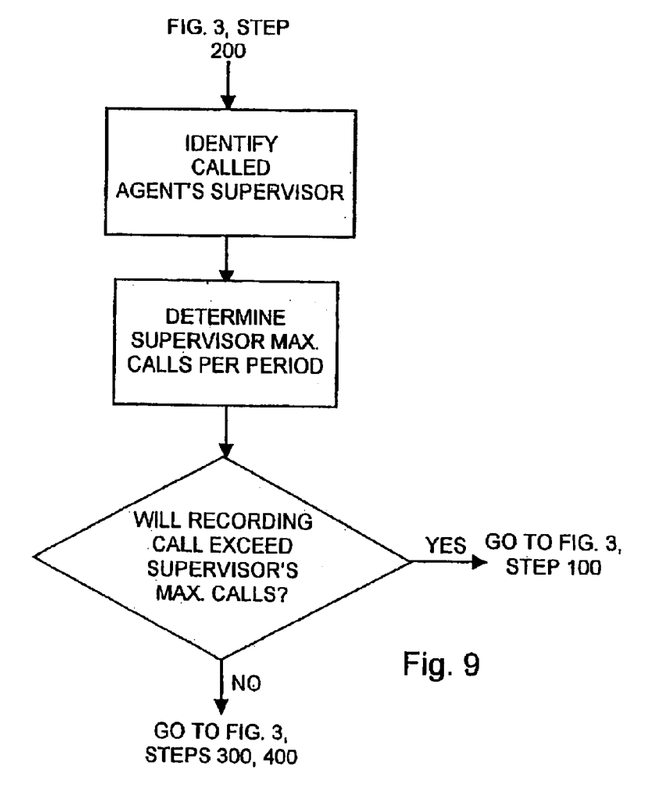

Reference is now made to FIG. 9, which is a simplified flowchart illustration of an implementation of determining step 200 of FIG. 3, operative in accordance with a preferred embodiment of the present invention. In the method shown the determining step comprises associating the agent with a supervisor, with the agent's supervisor typically maintained in admin database 46. The number of calls which the supervisor is to monitor in a given time period is then determined, the information typically maintained in schedule database 38. The monitoring condition is satisfied if recording the call currently in progress and within the time period will not cause the number of calls to be exceeded.

Figure 10:
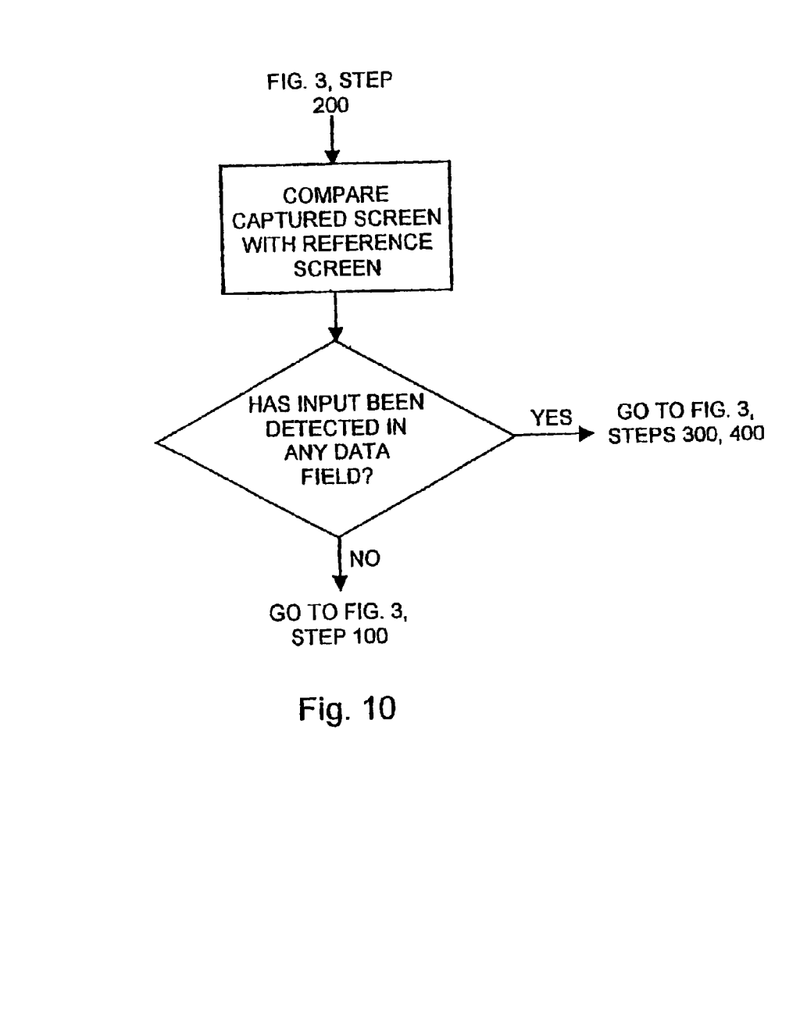

Reference is now made to FIG. 10, which is a simplified flowchart illustration of an implementation of determining step 200 of FIG. 3, operative in accordance with a preferred embodiment of the present invention. In the method shown the determining step comprises determining whether input has been entered into any data field appearing on a display of the computer. Evaluator 40 may provide this information by comparing a captured screen with a reference screen into which no data has been entered and storing an input indicator in forms database 42.

Figure 11:
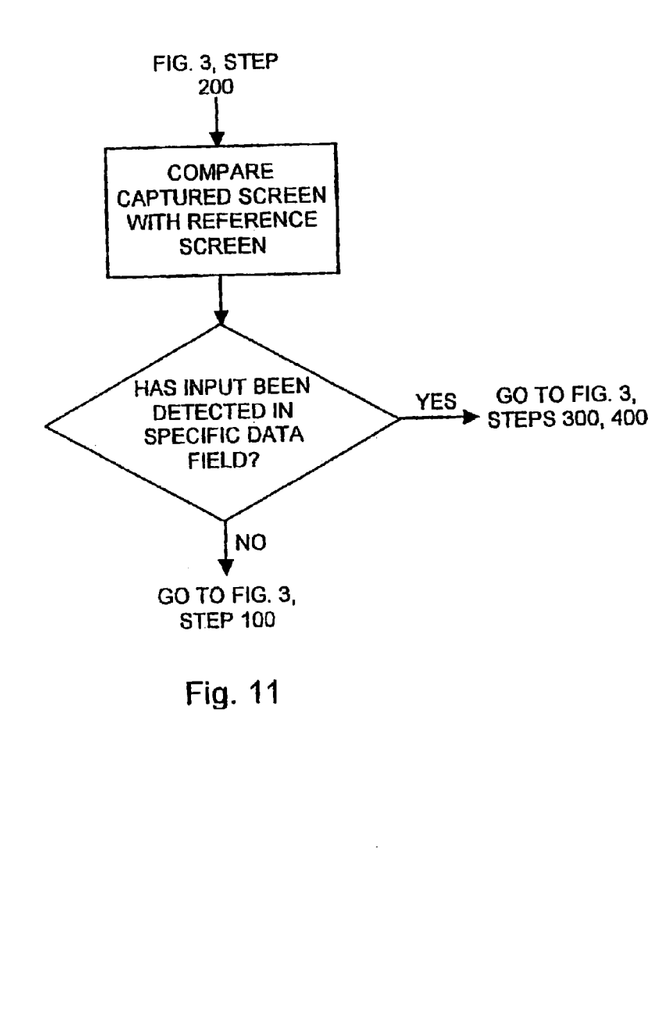

Reference is now made to FIG. 11, which is a simplified flowchart illustration of an implementation of determining step 200 of FIG. 3, operative in accordance with a preferred embodiment of the present invention. In the method shown the determining step comprises determining whether input has been entered into at least one specific data field appearing on a display of the computer. Evaluator 40 may provide this information by comparing a captured screen with a reference screen into which no data has been entered into the specific field and storing an input indicator in forms database 42.

Figure 12:
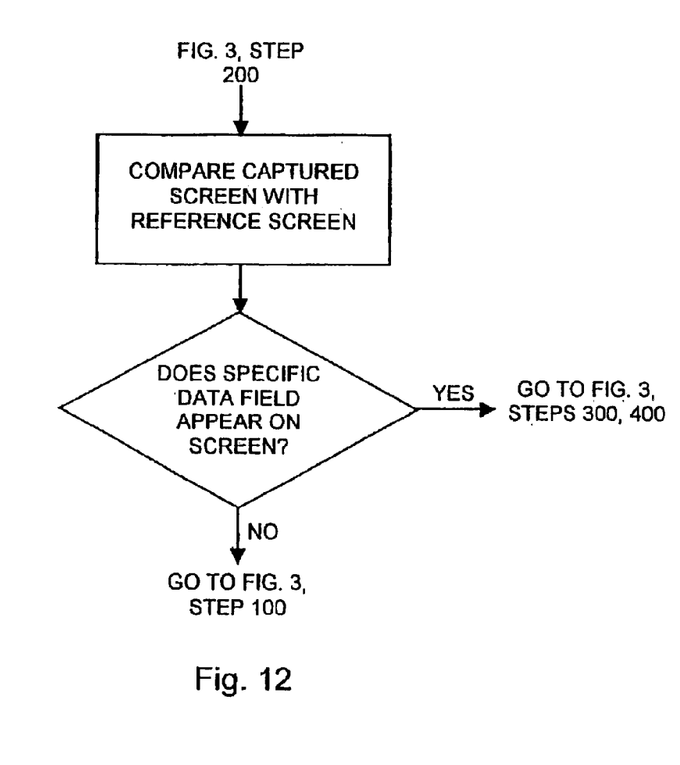

Reference is now made to FIG. 12 which is a simplified flowchart illustration of an implementation of determining step 200 of FIG. 3, operative in accordance with a preferred embodiment of the present invention. In the method shown the determining step comprises determining whether at least one specific data field appears on a display of the computer. Evaluator 40 may provide this information by comparing a captured screen with a reference screen containing the specific field and storing a field presence indicator in forms database 42.

Figure 13:
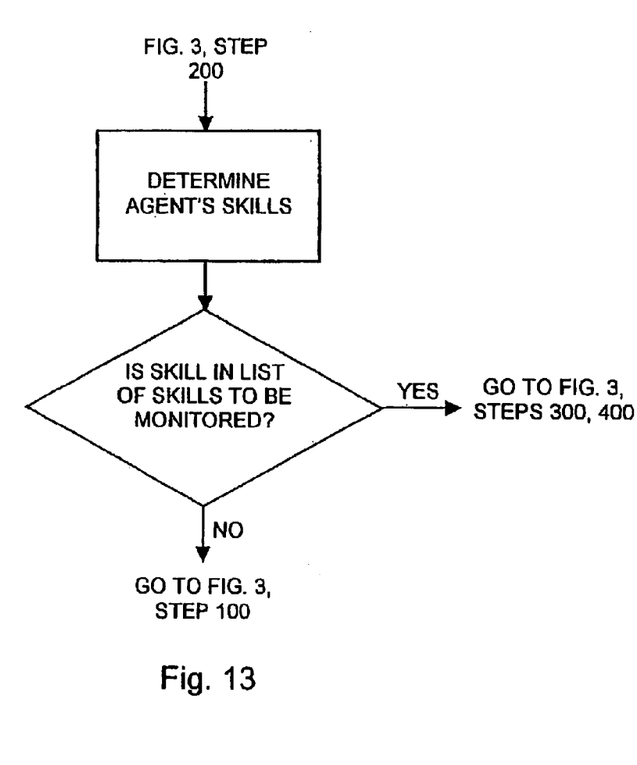

Reference is now made to FIG. 13, which is a simplified flowchart illustration of an implementation of determining step 200 of FIG. 3, operative in accordance with a preferred embodiment of the present invention. In the method shown the determining step comprises determining the agent's skills, the information typically maintained in admin database 46. The monitoring condition is satisfied if a possessed skill is among to a predetermined list of skills that warrant monitoring of the call.

Figure 14:
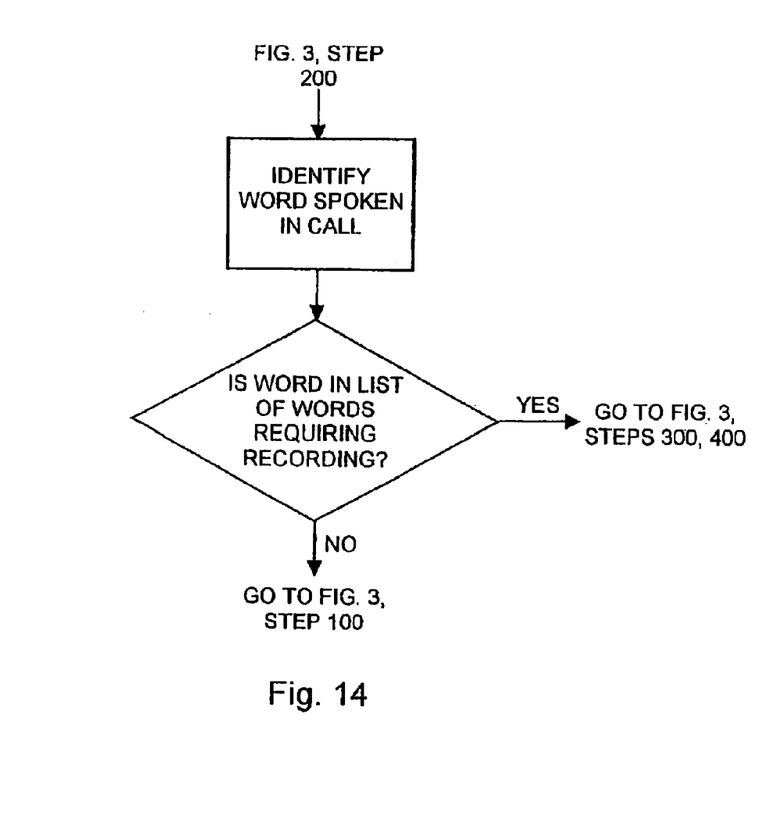

Reference is now made to FIG. 14, which is a simplified flowchart illustration of an implementation of determining step 200 of FIG. 3, operative in accordance with a preferred embodiment of the present invention. In the method shown the determining step comprises identifying at least one word spoken during the telephone call, the information typically maintained in forms database 42. The monitoring condition is satisfied if the word is in a database of words, which require the recording of telephone calls. Such a word may be "supervisor," possibly indicating a request to speak with a supervisor, or an obscenity.

Figure 15:
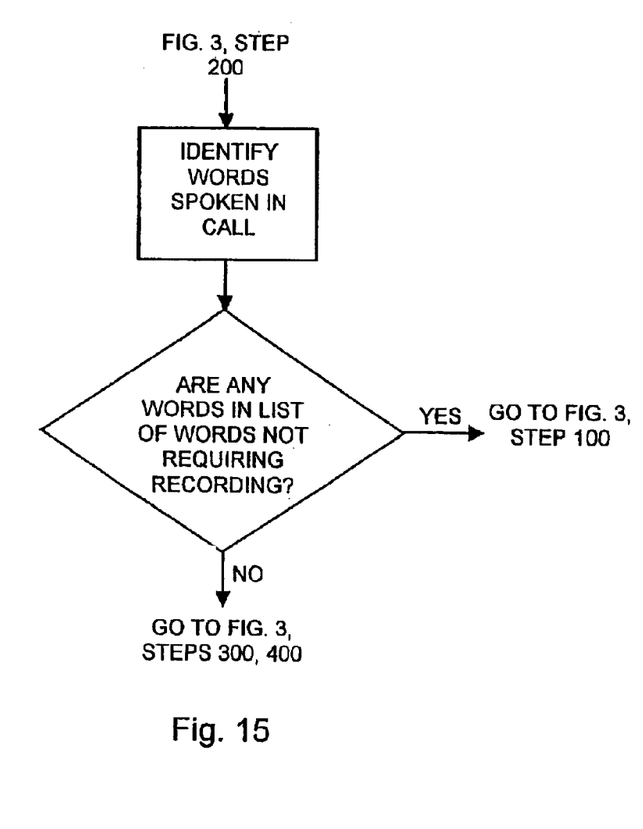

Reference is now made to FIG. 15, which is a simplified flowchart illustration of an implementation of determining step 200 of FIG. 3, operative in accordance with a preferred embodiment of the present invention. In the method shown the determining step comprises identifying a plurality of words spoken during the telephone call, the information typically maintained in forms database 42. The monitoring condition is satisfied if one or more "good" words as found in a database of words are not present the plurality of words. Such a word may be "please" or "thank you," the absence of which might indicate a service deficiency, and, therefore, a need to record.

Figure 16:
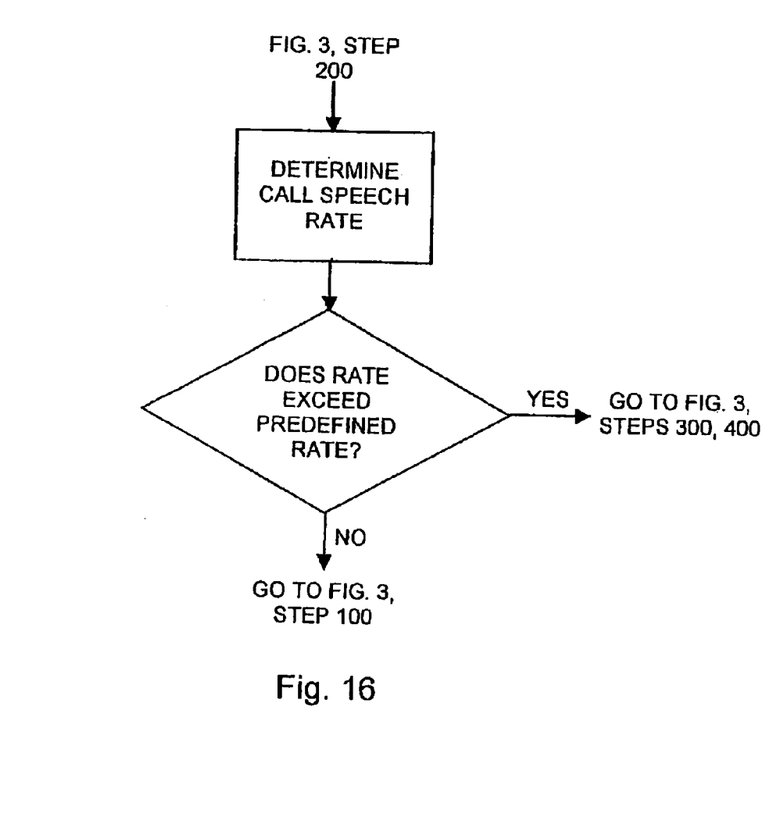

Reference is now made to FIG. 16, which is a simplified flowchart illustration of an implementation of determining step 200 of FIG. 3, operative in accordance with a preferred embodiment of the present invention. In the method shown the determining step comprises determining a speech rate of words spoken during the telephone call, the information typically maintained in forms database 42. The monitoring condition is satisfied if the speech rate exceeds a predefined speech rate, possibly indicating that the agent or the customer is talking too fast.

Figure 17:
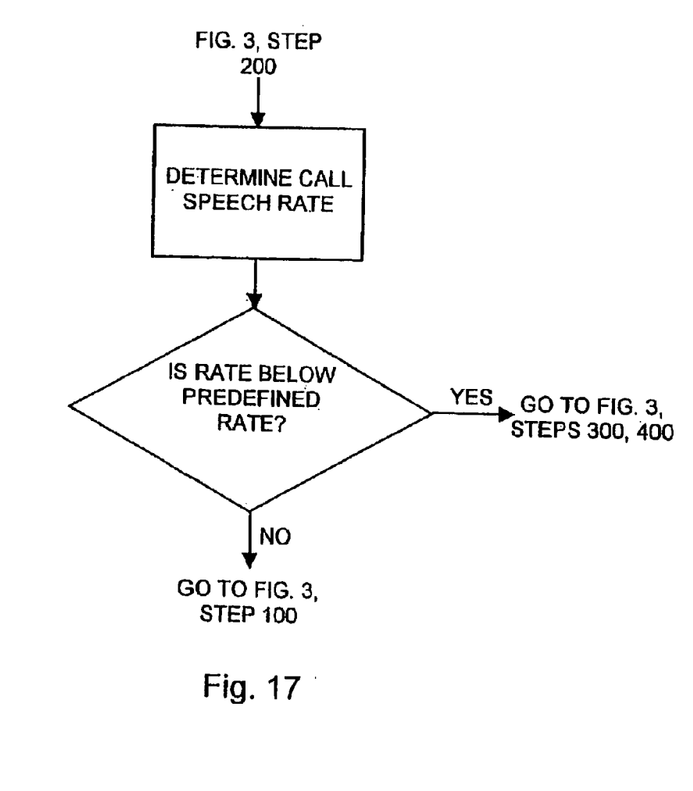

Reference is now made to FIG. 17, which is a simplified flowchart illustration of an implementation of determining step 200 of FIG. 3, operative in accordance with a preferred embodiment of the present invention. In the method shown the determining step comprises determining a speech rate of words spoken during the telephone call, the information typically maintained in forms database 42. The monitoring condition is satisfied if the speech rate is slower than a predefined speech rate, possibly indicating that the agent or the customer is talking too slowly.

Figure 18:
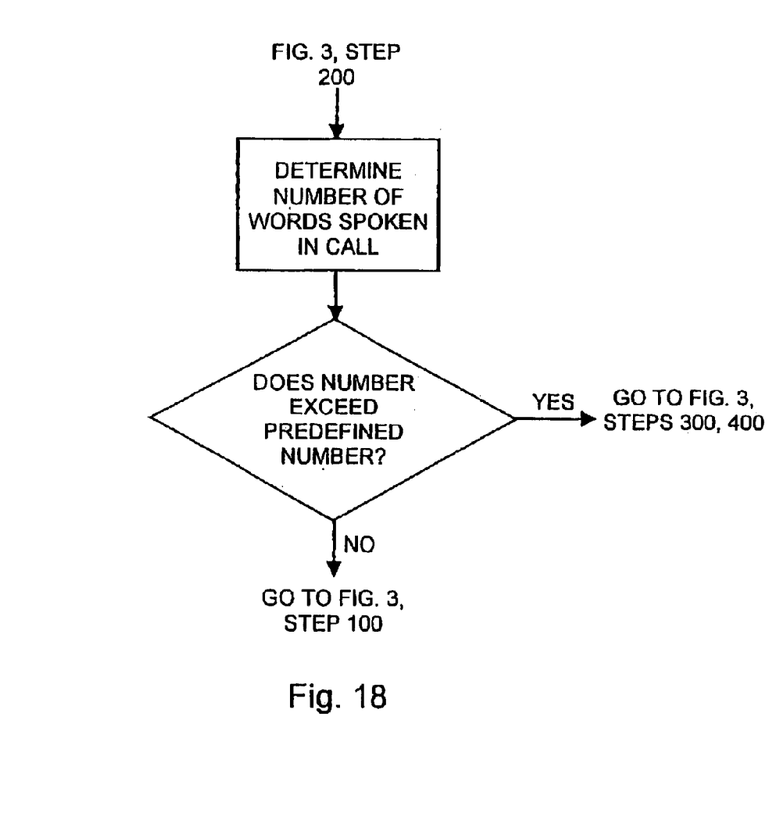

Reference is now made to FIG. 18, which is a simplified flowchart illustration of an implementation of determining step 200 of FIG. 3, operative in accordance with a preferred embodiment of the present invention. In the method shown the determining step comprises determining the number of words spoken during the telephone call, the information typically maintained in forms database 42. The monitoring condition is satisfied if the number of words exceeds a predefined number of words, possibly indicating that the call may involve a relatively complex issue.

Figure 19:
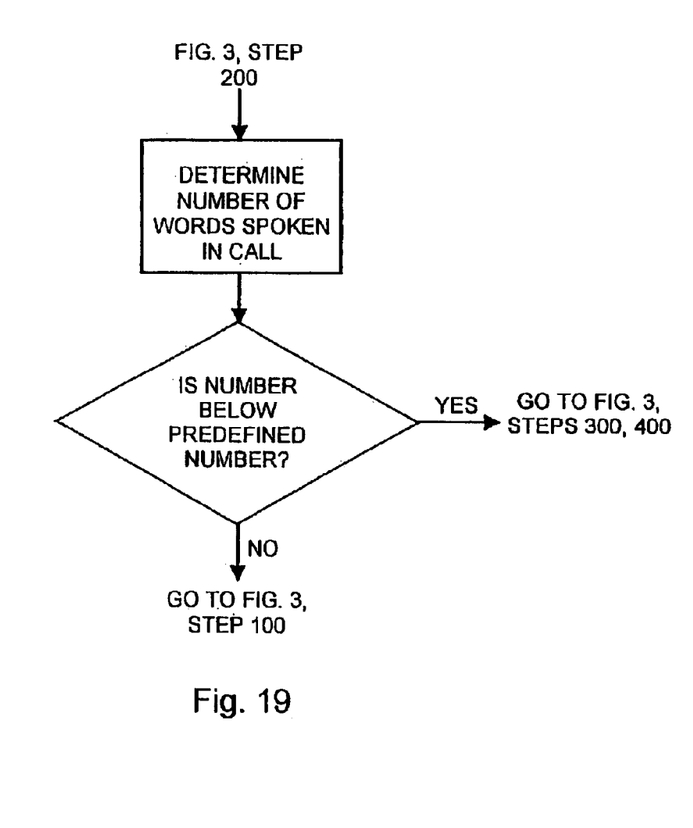

Reference is now made to FIG. 19, which is a simplified flowchart illustration of an implementation of determining step 200 of FIG. 3, operative in accordance with a preferred embodiment of the present invention. In the method shown the determining step comprises determining the number of words spoken during the telephone call, the information typically maintained in forms database 42. The monitoring condition is satisfied if the number of words is less than a predefined number of words, possibly indicating that the call may not be progressing satisfactorily.

Figure 20:
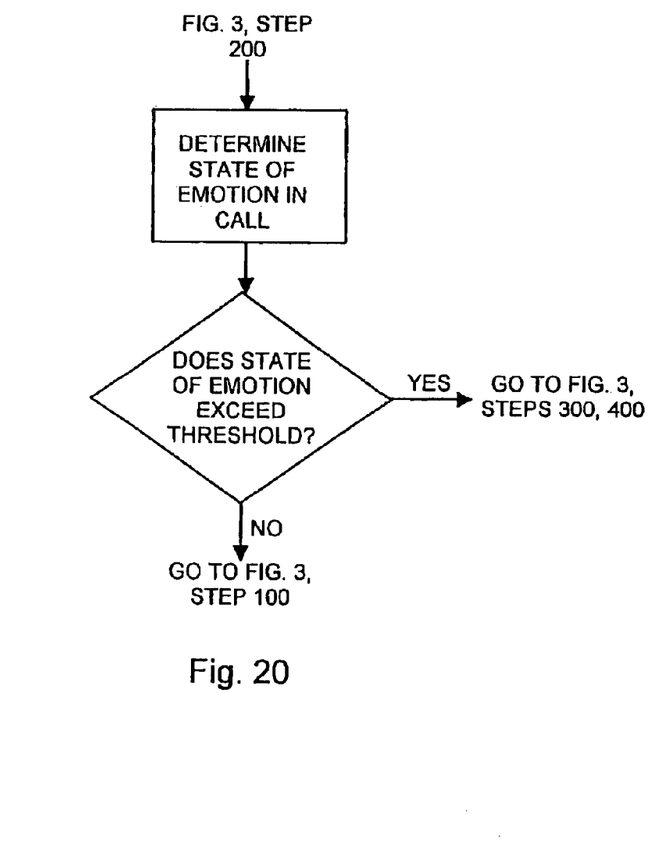

Reference is now made to FIG. 20, which is a simplified flowchart illustration of an implementation of determining step 200 of FIG. 3, operative in accordance with a preferred embodiment of the present invention. In the method shown the determining step comprises determining the state of emotion present during the telephone call using conventional means, such as the TRUSTECH system, commercially available from Truster, Ltd. of Israel. The data relating to telephone call emotion levels may be maintained in forms database 42. The monitoring condition is satisfied if the detected state of emotion exceeds a certain emotion threshold as measured by the emotion detecting means.

Figure 21:
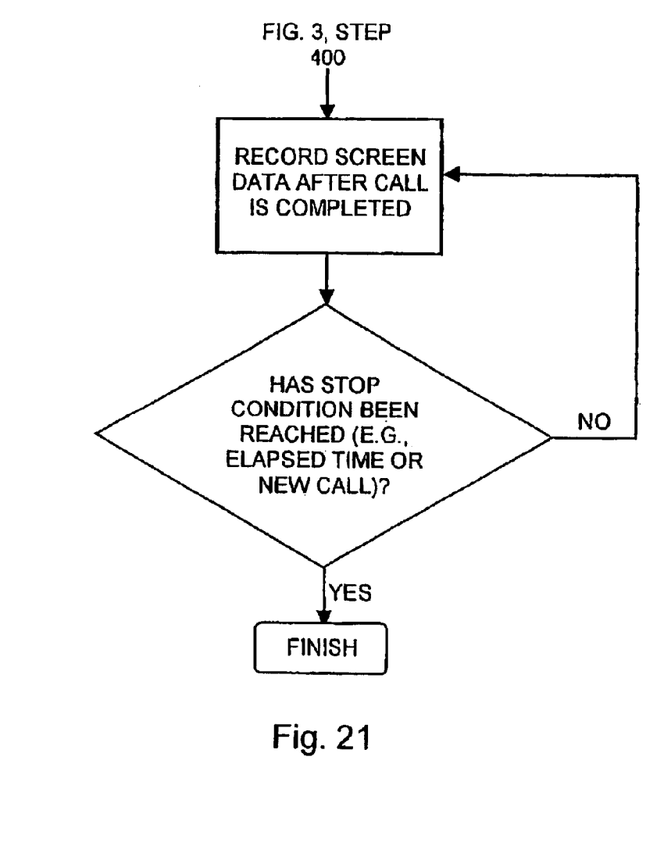
FIG. 21 is a simplified flowchart illustration of an implementation of recording step 400 of FIG. 3, operative in accordance with a preferred embodiment of the present invention.

Reference is now made to FIG. 21, which is a simplified flowchart illustration of an implementation of recording step 400 of FIG. 3, operative in accordance with a preferred embodiment of the present invention. In the method shown the recording step comprises recording at least a portion of the agent's interactions with the computer after completion of the telephone call until a stop condition is reached. The stop condition may be an elapsed period of time and/or the receipt of a notification subsequent to the notification received in step 100 that a customer telephone call is currently in progress with the agent.

Figure 22:
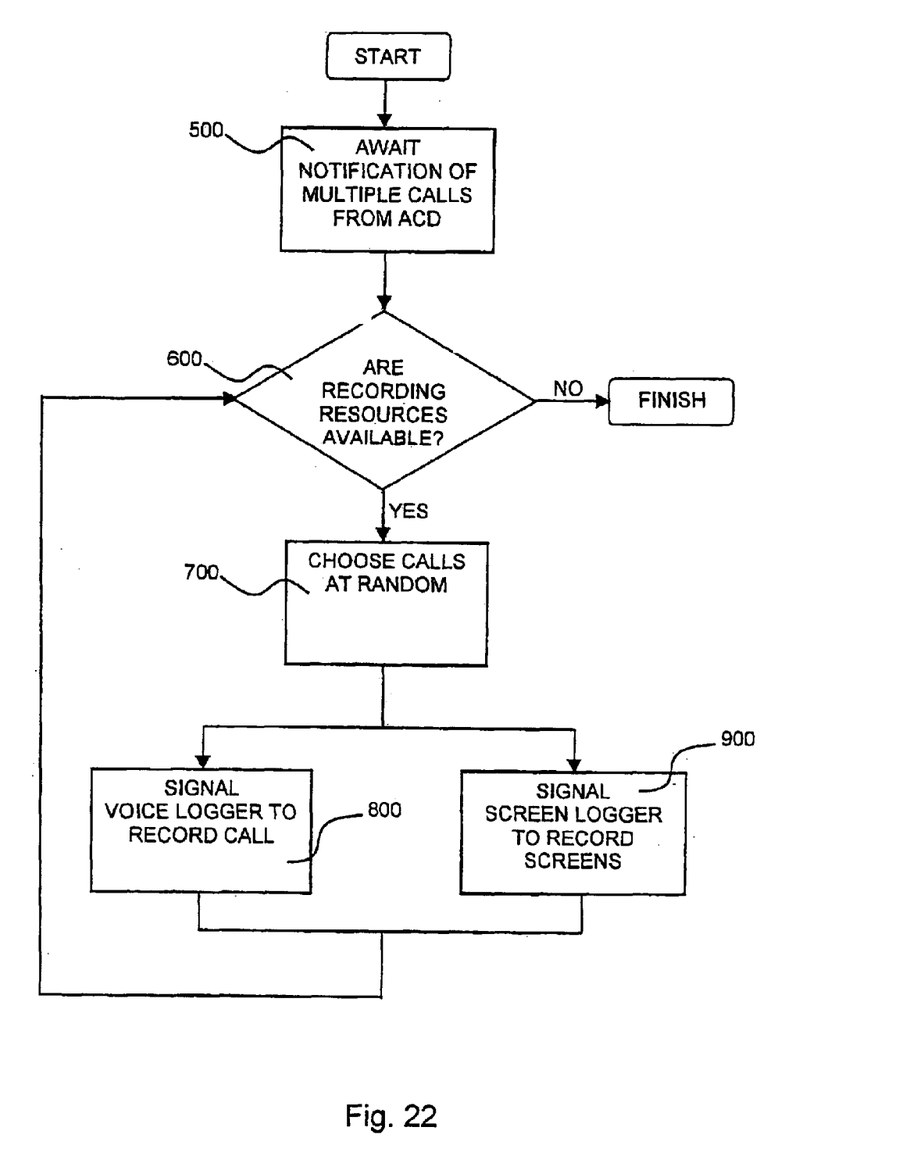
FIG. 22 is a simplified flowchart illustration of a method of operation of monitoring system 16 of FIG. 1, the method being operative in accordance with a preferred embodiment of the present invention.

Reference is now made to FIG. 22 which is a simplified flowchart illustration of a method of operation of monitoring system 16 of FIG. 1, the method being operative in accordance with a preferred embodiment of the present invention. In the method of FIG. 22 multiple notifications are received from ACD 10 indicating that multiple calls are currently in progress with multiple agents (step 500). Event manager 32 (FIG. 2) then determines whether recording resources are currently available for recording thereto (step 600). If recording resources are currently available, event manager 32 signals voice logger 28 to select any of the telephone calls at random (step 700) and record some or all of the audio of the selected calls (step 800) and screen logger 30 to record in synchronicity with the audio recordings of voice logger 28 some or all of the selected agent's interactions with the agent's workstation during the telephone call, preferably in the form of screen data captures (step 900). Recording preferably continues until the recording resources are no longer currently available for recording thereto.

It is appreciated that any of the methods described hereinabove may be carried out after one or more of the telephone calls to be evaluated have been fully recorded. In such circumstances a telephone call is pre-recorded without regard to whether or not a particular monitoring condition was satisfied. At a later time the telephone call is evaluated to determine whether the telephone call is to be retained by determining whether it meets a monitoring condition. The monitoring condition thus serves as a retention condition which, if satisfied, results in the pre-recorded telephone call being retained. The pre-recorded telephone call is then tagged with a retention indicator to indicate that the call is to be retained. The telephone call may also be tagged with a release indicator indicating when the retention indicator is to be removed, such as by specifying a predefined period of time after which said retention indicator is to be removed, or by specifying that the retention indicator is to be removed upon conclusion of an evaluation of the telephone call or after a certain period of time thereafter. The tagging with the retention indicator and/or the release indicator may be done subsequent to performing an evaluation of said telephone call, such as by a supervisor. The release indicator may also indicate a storage threshold such that the retention indicator is removed after the storage threshold of recorded telephone calls is exceeded.

The methods and apparatus disclosed herein have been described without reference to specific hardware or software. Rather, the methods and apparatus have been described in a manner sufficient to enable persons having ordinary skill in the art to readily adapt commercially available hardware and software as may be needed to reduce any of the embodiments of the present invention to practice without undue experimentation and using conventional techniques.

While the present invention has been described with reference to a few specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

What is claimed is:

1. A monitoring system for monitoring interactions of an agent with customers comprising:
   a voice logger to receive and record audio of a telephone call of said agent;
   a screen logger to receive and record video screen data associated with interactions of said agent with a computer during the telephone call; and
   an event manager to determine whether said interactions with the computer during the telephone call meet at least one predefined monitoring condition.

2. The monitoring system of claim 1, wherein said event manager is able to instruct said voice logger to begin recording an audio portion of said telephone call when said monitoring condition is satisfied.

3. The monitoring system of claim 1, wherein said event manager is able to instruct said voice logger to begin recording of an audio portion of said telephone call and to instruct said screen logger to begin recording generally in synchronicity with said voice logger at least a portion of said video screen data when said monitoring condition is satisfied.

4. The monitoring system of claim 1 further comprising:
   a storage media to store at least a portion of recorded audio of said telephone call and recorded video screen data associated with said telephone call.

5. The monitoring system of claim 1, further comprising:
   an evaluator coupled to said voice logger and to said screen logger to enable design of evaluation forms.

6. The monitoring system of claim 5, wherein said evaluator is able to perform automated evaluations based on predefined programming.

* * * * *